United States Patent
Iimi et al.

(10) Patent No.: US 7,299,163 B2
(45) Date of Patent: Nov. 20, 2007

(54) DEVICE, METHOD, AND PROGRAM FOR DESIGN-AIDING OF CASTING PRODUCT

(75) Inventors: Hidenori Iimi, Obu (JP); Ryotaro Kojima, Anjo (JP)

(73) Assignee: DENSO Corporation, Kariya (JP)

( * ) Notice: Subject to any disclaimer, the term of this patent is extended or adjusted under 35 U.S.C. 154(b) by 661 days.

(21) Appl. No.: 10/633,750

(22) Filed: Aug. 4, 2003

(65) Prior Publication Data

US 2004/0024480 A1  Feb. 5, 2004

(30) Foreign Application Priority Data

Aug. 5, 2002  (JP) .............................. 2002-227360

(51) Int. Cl.
*G06F 7/60* (2006.01)
(52) U.S. Cl. ......................................................... 703/2
(58) Field of Classification Search .................. 703/2; 164/466

See application file for complete search history.

(56) References Cited

U.S. PATENT DOCUMENTS

| | | | |
|---|---|---|---|
| 4,696,337 A * | 9/1987 | Grochal et al. | 164/150.1 |
| 5,535,812 A * | 7/1996 | Singleton | 164/479 |
| 6,241,004 B1 * | 6/2001 | Ebisu et al. | 164/466 |
| 2004/0024480 A1 * | 2/2004 | Iimi et al. | 700/98 |

FOREIGN PATENT DOCUMENTS

| | | | |
|---|---|---|---|
| GB | 2160454 A | * | 12/1985 |
| JP | 61046360 A | * | 3/1986 |
| JP | 61049761 A | * | 3/1986 |
| JP | 62045458 A | * | 2/1987 |
| JP | 04033761 A | * | 2/1992 |
| JP | 08155627 A | * | 6/1996 |
| JP | 08257715 A | * | 10/1996 |
| JP | 2001-287023 | | 10/2001 |

OTHER PUBLICATIONS

Naoki et al. "134th Japan Lecture Convention of Japan Foundry Engineering Society" May 29, 1999, pp. 1-2.*

(Continued)

*Primary Examiner*—Kamini Shah
*Assistant Examiner*—Saif A Alhija
(74) *Attorney, Agent, or Firm*—Harness, Dickey & Pierce, PLC (57) ABSTRACT

A shape of an inputted casting product is divided into a plurality of cells. A heat-transfer solidification of a molted metal is analyzed. A value of $G/\sqrt{R}$ (G: temperature gradient, R: cooling rate) is computed in each cell. A corresponding value, as a specific gravity value, corresponding to $G/\sqrt{R}$ in each cell is retrieved from a database unit to be assigned to each cell. Cells included in a region are stratified and counted with respect to each corresponding value. Each counted number is multiplied by each corresponding cell volume to obtain a volume. The volume is multiplied by each corresponding value to obtain a product. All the products corresponding to all the corresponding values within the region are summed up and then divided by a region volume to obtain a shrinkage porosity occurrence rate as a specific gravity value of the region.

2 Claims, 9 Drawing Sheets

OTHER PUBLICATIONS

Naoki et al. "136th Japan Lecture Convention of Japan Foundry Engineering Society" May 22, 2000, pp. 1-2.*
Naoki et al. "134th Japan Lecture Convention of Japan Foundry Engineering Society" May 29, 1999, p. 1-2.*
Naoki et al. "136th Japan Lecture Convention of Japan Foundry Engineering Society" May 22, 2000, p. 1-2.*
134th Japan Lecture Convention of Japan Foundry Engineering Society, May 29, 1999, by Maru Naoki, Daimaru Cogyo Co., Okane Toshimitsu, Tokyo University, et al, with English translation.
136th Japan Lecture Convention of Japan Foundry Engineering Society, May 22, 2000, by Maru Naoki, Daimaru Cogyo Co., Okane Toshimitsu, Tokyo University, et al, with English translation.

* cited by examiner

DEVICE, METHOD, AND PROGRAM FOR DESIGN-AIDING OF CASTING PRODUCT

CROSS REFERENCE TO RELATED APPLICATIONS

This application is based on and incorporates herein by reference Japanese Patent Application No. 2002-227360 filed on Aug. 5, 2002.

FIELD OF THE INVENTION

The present invention relates to a device, method, and program for design-aiding of a casting product.

BACKGROUND OF THE INVENTION

Figure 9:
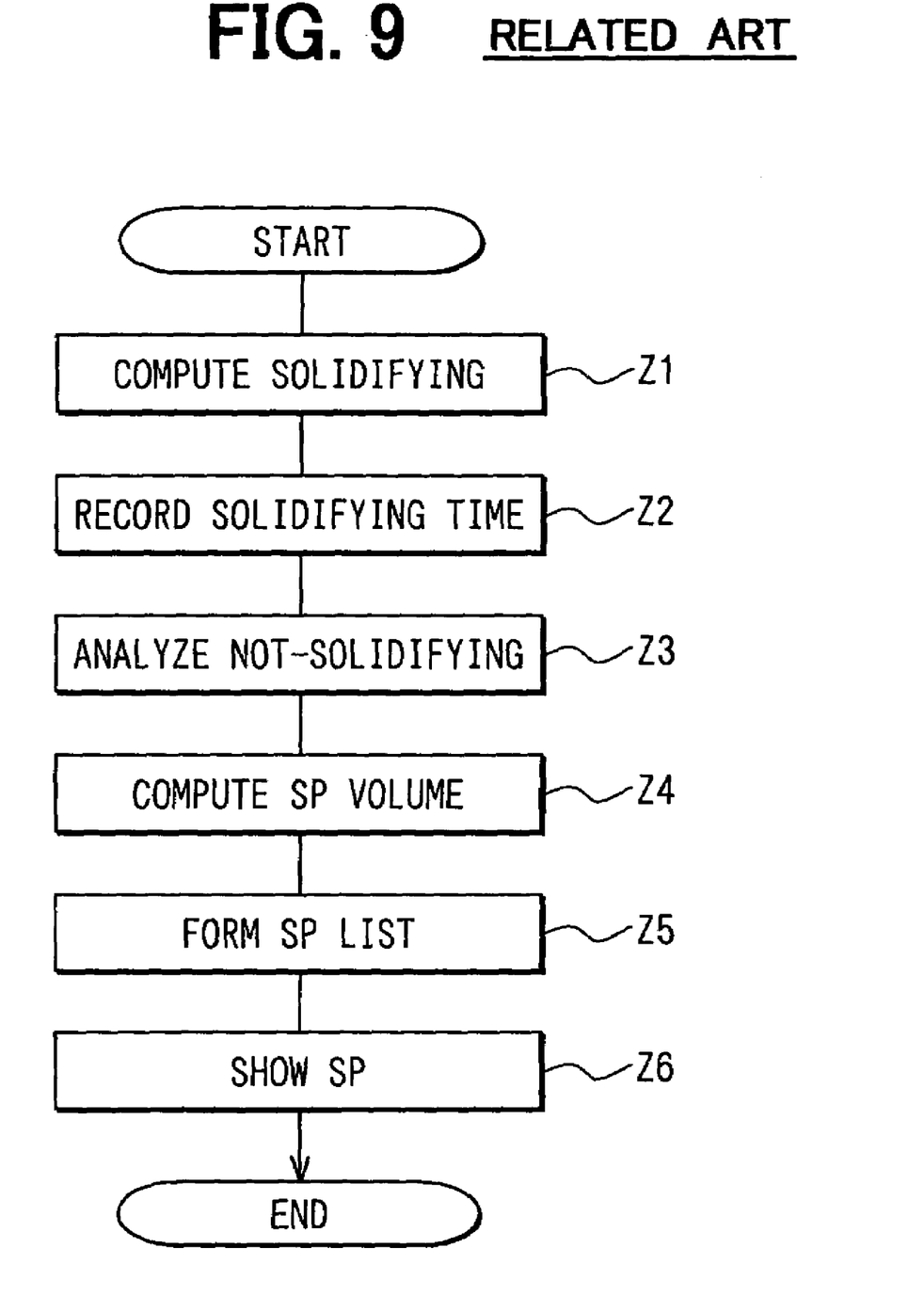
FIG. 9 is a flow chart diagram explaining processing of a related art.

JP-A-2001-287023 discloses a solidification analyzing method as a design-aiding method for a cast metal product with a compute. This method includes several steps as follows, as shown in FIG. 9. At Step Z1, after an analyzed target is divided into a plurality of cells, a solidifying process of a molted metal in each cell is computed by solving an equation of heat conduction with a calculus of finite differences. At Step Z2, a solidifying time is recorded. At Step Z3, disruption of not solidifying portion and its solidifying process are analyzed during the course of solidifying. At Step Z4, a volume of generated shrinkage porosity (SP) is computed. At Step Z5, a list of shrinkage cavities is formed with including positions and volumes of all the shrinkage cavities. At Step Z6, all the shrinkage cavities in the list are three-dimensionally shown in a display.

The above design-aiding method thus mainly analyzes the positions and the volumes of the generated shrinkage cavities during the course of the solidifying. Although the analyzed shrinkage cavities are three-dimensionally shown in the display, it does not lead to determining whether required strength or durability is obtained. This is an obstacle for designers of casting metal products to use the design-aiding method in actual designing.

SUMMARY OF THE INVENTION

It is an object of the present invention to provide a device, method, and program for design-aiding of a casting product enabling easily determining influence of shrinkage cavities on solid state properties of the casting product.

To achieve the above object, a design-aiding device is provided with the following. Solidification process is analyzed based on temperature change of a melted material of the casting product in elapse of time in a three-dimensional model that corresponds to the casting product and is formed of a plurality of cells. Shrinkage porosity occurrence rates of the cells in the three-dimensional model are computed from a result of analyzing. The shrinkage porosity occurrence rates of the cells are stratified and converted to specific gravity values. A region including cells is designated for being evaluated. A shrinkage porosity occurrence rate of the region is quantified, by computing a volume with respect to each of the specific gravity values of the corresponding cells, multiplying the computed volume by each of the specific gravity values to obtain a product, and then summing up all the products corresponding to all the specific gravity values of the corresponding cells included in the region. This structure enables a designer to easily grasp influence of the shrinkage porosity on solid state properties of the product and to determine whether the casting product should be redesigned. This results in remarkably shortening a production preparation period for designing or redesigning a mold, and enhancing quality of the casting product.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
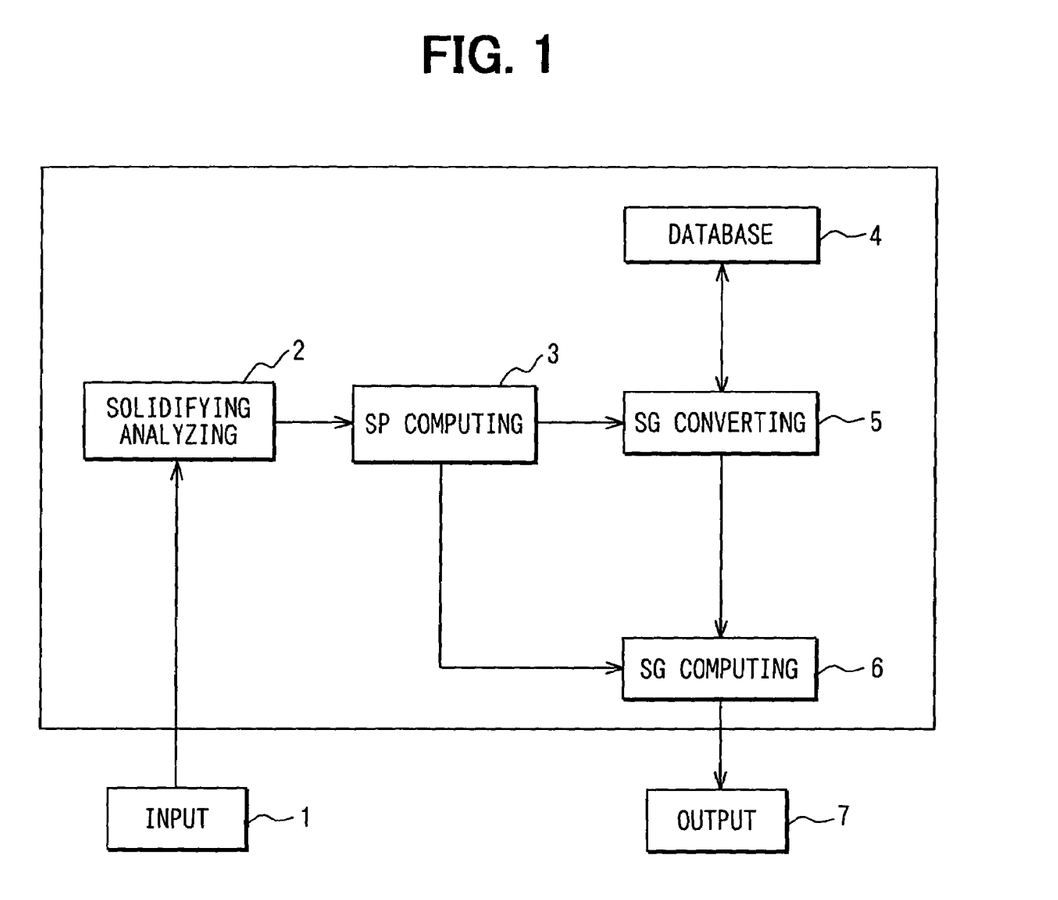
FIG. 1 is a block diagram showing an overall structure of a design-aiding device according to a first embodiment of the present invention.

A design-aiding device shown in FIG. 1 as a first embodiment of the present invention is constructed by storing an after-described design-aiding program in a memory of a personal computer and the like. The design-aiding device computes specific gravity (SG) values based on occurrence rates of shrinkage cavities in the respective regions of a designed die-casting metal product.

An input unit 1 such as a keyboard or a mouse inputs shape data (three-dimensional solid model) of a designed casting product, a melted metal, casting condition, or the like. Furthermore, it sets the number of strata of an occurrence rate of shrinkage porosity, and designates a region of the casting product, the region whose specific gravity is to be computed. The input unit 1 can read the three-dimensional solid model that is formed by a computer-aided design.

A heat-transfer solidifying analyzing unit 2 divides the three-dimensional solid model into a plurality of cells that are tetrahedral. It furthermore analyzes heat-transfer solidifying of the melted metal in elapse of time to thereby compute a temperature gradient (G) [° C./mm] and cooling rate (R) [° C./sec] of the melted metal in the respective cells.

A shrinkage porosity (SP) computing unit 3 computes a shrinkage porosity occurrence rate of each cell as a value of $G/\sqrt{R}$ that is a shrinkage porosity predictive equation. The shrinkage porosity predictive equation can be $G/t$ (t: solidifying time of melted metal), $G \times t^{2/3}/V$ (V: solidifying speed) or the like, instead of $G/\sqrt{R}$. Furthermore, the shrinkage porosity occurrence rate can be a result from directly computing occurrence of the shrinkage porosity with simulation considering flow or pressure.

A database unit 4 stores specific-gravity-converted (SG-converted) values with respect to the number of strata of occurrence rates of the shrinkage porosity and to a kind of melted metal used in casting. Here, the SG-converted value corresponds to the value of $G/\sqrt{R}$. Namely, the value of $G/\sqrt{R}$ is converted to the SG-converted value that is treated as a specific value.

A specific gravity (SG) converting unit 5 retrieves, from the database unit 4, an SG-converted value based on the value of $G/\sqrt{R}$, the number of strata of occurrence rates of the shrinkage porosity, and the kind of melted metal used in casting, to assign the SG-converted value to the respective cells.

A specific gravity (SG) computing unit 6 as a quantifying means quantifies an occurrence rate of shrinkage porosity in a certain region designated by the input unit 1 by the following steps:

(1) searching for SG-converted values $\rho(j)$ ($1 \leq j \leq m$) assigned to respective cells within the certain region;

(2) stratifying the searched SG-converted values $\rho(j)$;

(3) counting the number $N\rho(j)$ of the cells with respect to each SG-converted value $\rho(j)$;

(4) computing a first product of the counted number $N\rho(j)$ and a cell volume $V\rho(j)$ corresponding to each SG-converted value $\rho(j)$, as a first volume $Vf\rho(j)(=N\rho(j) \times V\rho(j))$ corresponding to each SG-converted value $\rho(j)$;

(5) computing a second product of the first volume $Vf\rho(j)$ and the corresponding SG-converted value $\rho(j)$, as a weight $W\rho(j)$ $(=N\rho(j) \times V\rho(j) \times \rho(j) = Vf\rho(j) \times \rho(j))$;

(6) computing the sum of the weights $W\rho(j)$ corresponding to the respective SG-converted values $\rho(j)$, as a region weight $$W\left(=\sum_{j=1}^{j=m} W\rho(j) = N\rho(1) \times V\rho(1) \times \rho(1) + N\rho(2) \times V\rho(2) \times \rho(2) + \ldots + N\rho(m) \times V\rho(m) \times \rho(m)\right);$$

(7) computing (quantifying) the quotient when the region weight W is divided by a region volume V, as a region specific gravity $\rho$ ($=W/V$) that indicates the occurrence rate of the shrinkage porosity of the certain region.

The output unit 7 such as a display shows the computed respective region specific gravities of the respective regions of the casting metal product. The output unit 7 can be a speaker instead of the display.

Figure 2:
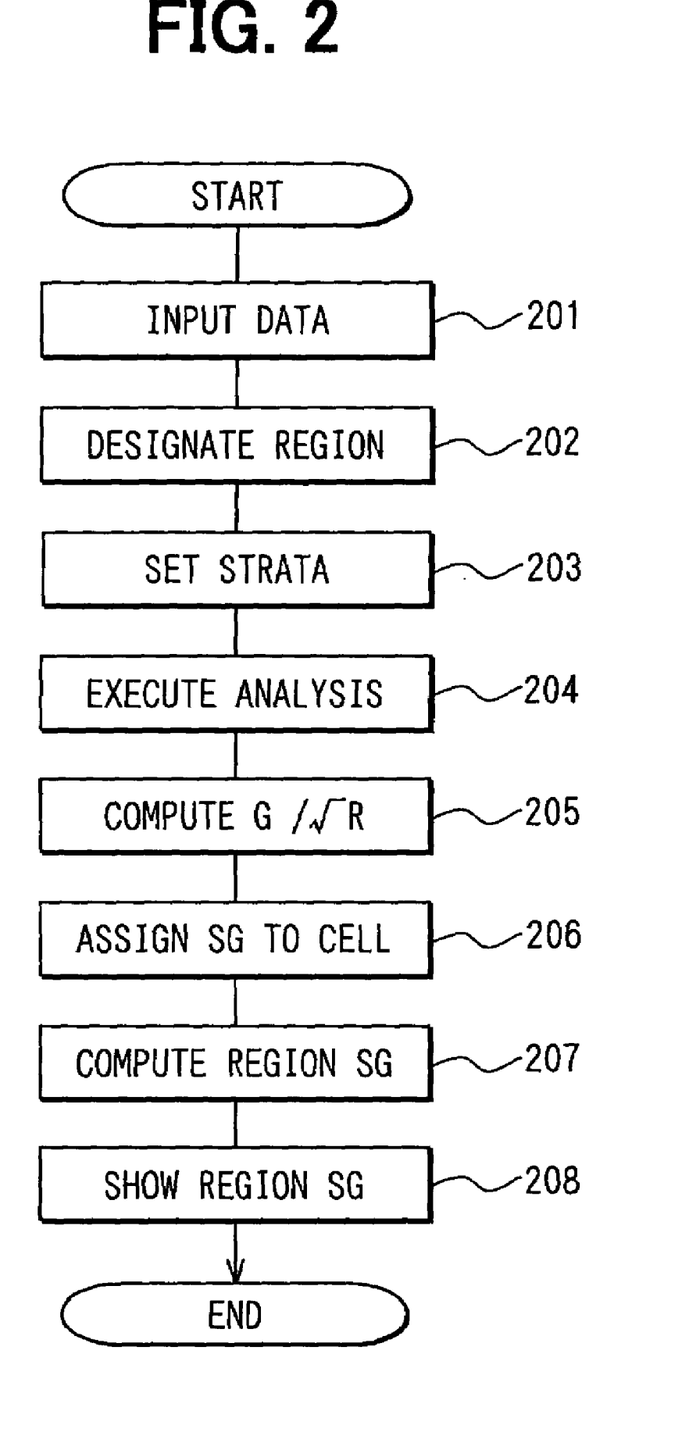
FIG. 2 a flow chart diagram explaining processing of a design-aiding program executed by the design-aiding device according to the first embodiment.

Processing of an design-aiding program executed in the design-aiding device according to the first embodiment will be explained with reference to FIG. 2.

At Step 201, shape data (three-dimensional solid model) of a designed casting product, a melted metal, casting condition, or the like are inputted.

At Step 202, a region of the casting product is designated for computing a specific gravity from the inputted three-dimensional solid model. Since a shrinkage porosity occurrence rate depends on a region of the casting product, a region for computing a specific gravity is selected in each case.

At Step 203, the number (more than one) of strata of shrinkage porosity occurrence rates is set. This enables the number of strata of a shrinkage porosity occurrence rate to be set according to accuracy in quantifying the shrinkage porosity occurrence rate.

For instance, in an earlier stage of designing, a designer wants generally to understand, regarding a designed product, a shrinkage porosity occurrence rate or strength reduction due to shrinkage porosity. Here, the number of strata is set to a smaller number to decrease processing time for quantifying. By contrast, in a later stage, the designer needs to quantify in high accuracy, so that the number of the strata is set to a larger number.

At Step 204, the three-dimensional solid model inputted at Step 201 is divided into a plurality of cells (tetrahedron). Heat-transfer solidifying of the melted metal in elapse of time is analyzed to thereby compute a temperature gradient (G) and cooling speed (R) of the melted metal in the respective cells.

At Step 205, a shrinkage porosity occurrence rate in each cell is computed as a value of $G/\sqrt{R}$ that is a shrinkage porosity predictive equation. By using the equation includes a cooling rate in addition to a temperature gradient, the shrinkage porosity occurrence rate can be obtained with high accuracy.

At Step 206, an SG-converted value is assigned to each cell based on the value of $G/\sqrt{R}$, the number of strata of occurrence rates of the shrinkage porosity, and the kind of melted metal used in casting.

At Step 207, a shrinkage porosity occurrence rate in each region designated at Step 202 is quantified as a specific gravity by the same steps as explained in the SG computing unit 6. Namely, SG-converted values $\rho(j)$ ($1 \leq j \leq m$) assigned to respective cells are searched and stratified. The number $N\rho(j)$ of the cells with respect to each SG-converted value $\rho(j)$ is multiplied with a cell volume $V\rho(j)$ corresponding to each SG-converted value $\rho(j)$. Each of the preceding products is furthermore multiplied with the SG-converted value $\rho(j)$, and summed up to obtain a region weight $$W\left(=\sum_{j=1}^{j=m} W\rho(j) = N\rho(1) \times V\rho(1) \times \rho(1) + N\rho(2) \times V\rho(2) \times \rho(2) + \ldots + N\rho(m) \times V\rho(m) \times \rho(m)\right).$$

Finally, the quotient when the region weight W is divided by a region volume V is a region specific gravity $\rho$ ($=W/V$) that indicates the occurrence rate of the shrinkage porosity of the certain region.

Indicating the shrinkage porosity occurrence rate as the specific gravity enables the designer to easily determine whether the casting product is good or bad.

At Step 208, the computed specific gravity of the region is shown to notify the designer.

Executing the above design-aiding method enables the design-aiding device of the embodiment to compute and quantify a shrinkage porosity occurrence rate of a casting product. A designer can design a casting product with confirming whether the casting product meets requirement on solid state properties (e.x., strength) of the casting product. This results in remarkably shortening a production preparation period for designing or redesigning a mold, and enhancing quality of the casting product.

In the next place, an instance of computing a specific gravity of each region will be explained. A first housing of a product is divided into 17 regions to compute specific gravities of the respective regions in an earlier designing stage. A molted metal for casting is ADC 12 of an alumina alloy. A melted metal supply-stopping temperature is 650° C. A metal mold temperature is 150° C. A heat conduction coefficient of the ADC 12 is 8.400 W/m²k. In the earlier designing stage, a shrinkage porosity occurrence rate or strength reduction is roughly required, so that the number of strata of values of $G/\sqrt{R}$ corresponds to the shrinkage porosity occurrence rates is set to two.

Figure 3:
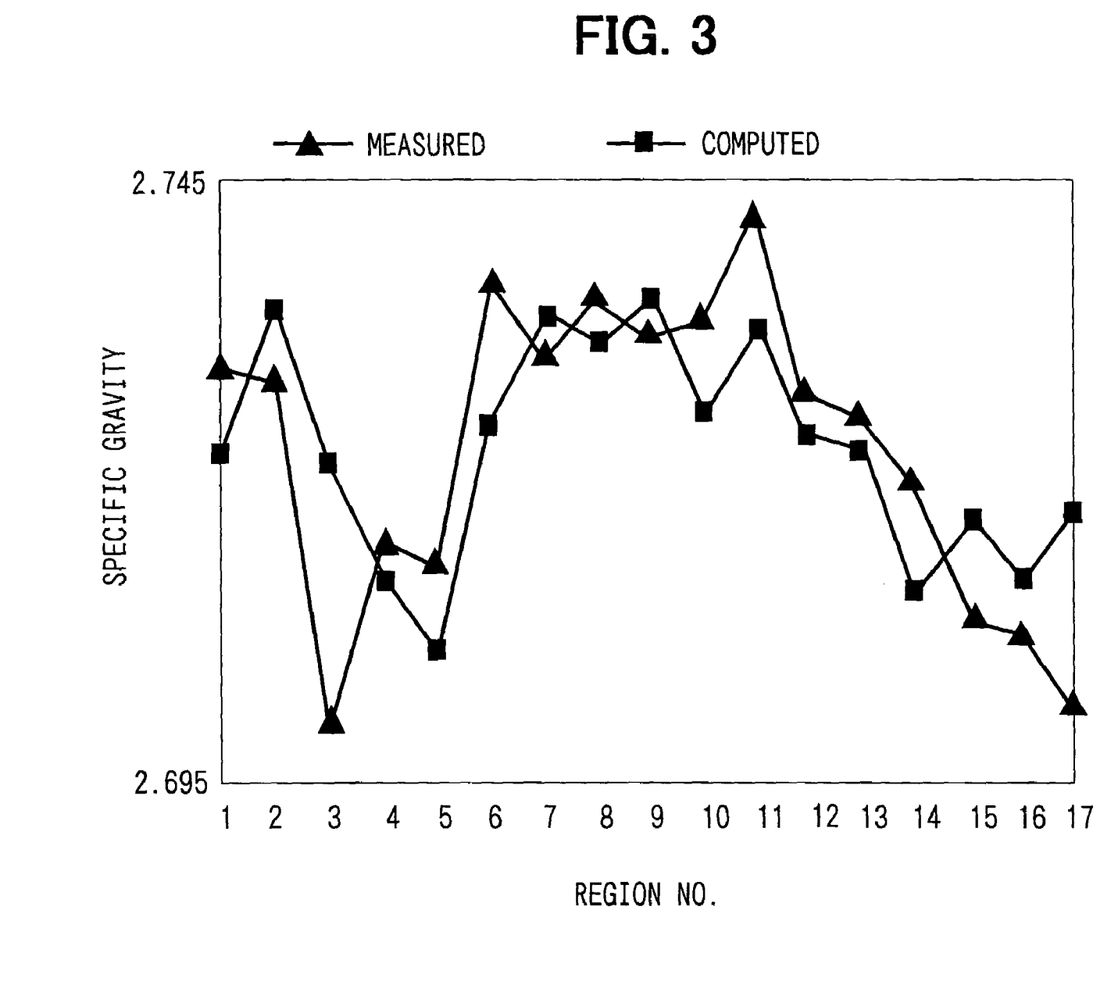
FIG. 3 is a graph showing actually measured values and computed values of a specific gravity in the respective regions of a first housing.

FIG. 3 shows computed specific gravities of the respective regions of the first housing and actually measured specific gravities of the corresponding regions of the first housing, as two graphs. It is understood that the two graphs nearly correspond to each other. A correlation coefficient between the two graphs is 0.7.

As a second instance, a second housing of a product is divided into 48 regions to compute specific gravities of the respective regions in a final designing stage. A melted metal for casting, a metal mold temperature, and a heat conduction coefficient are the same as in the first housing.

In a later designing stage, a shrinkage porosity occurrence rate or strength reduction is accurately required, so that the number of strata of values of $G/\sqrt{R}$ corresponds to the shrinkage porosity occurrence rates is set to fifteen. A melted metal supply-stopping temperature is set at 570 to 580° C. This is because setting of the melted metal supply-stopping temperature at 570 to 580° C. leads to high concordance rate of shrinkage porosity distribution between actually generated porosity and a computed value using the predictive equation of $G/\sqrt{R}$.

Figure 4:
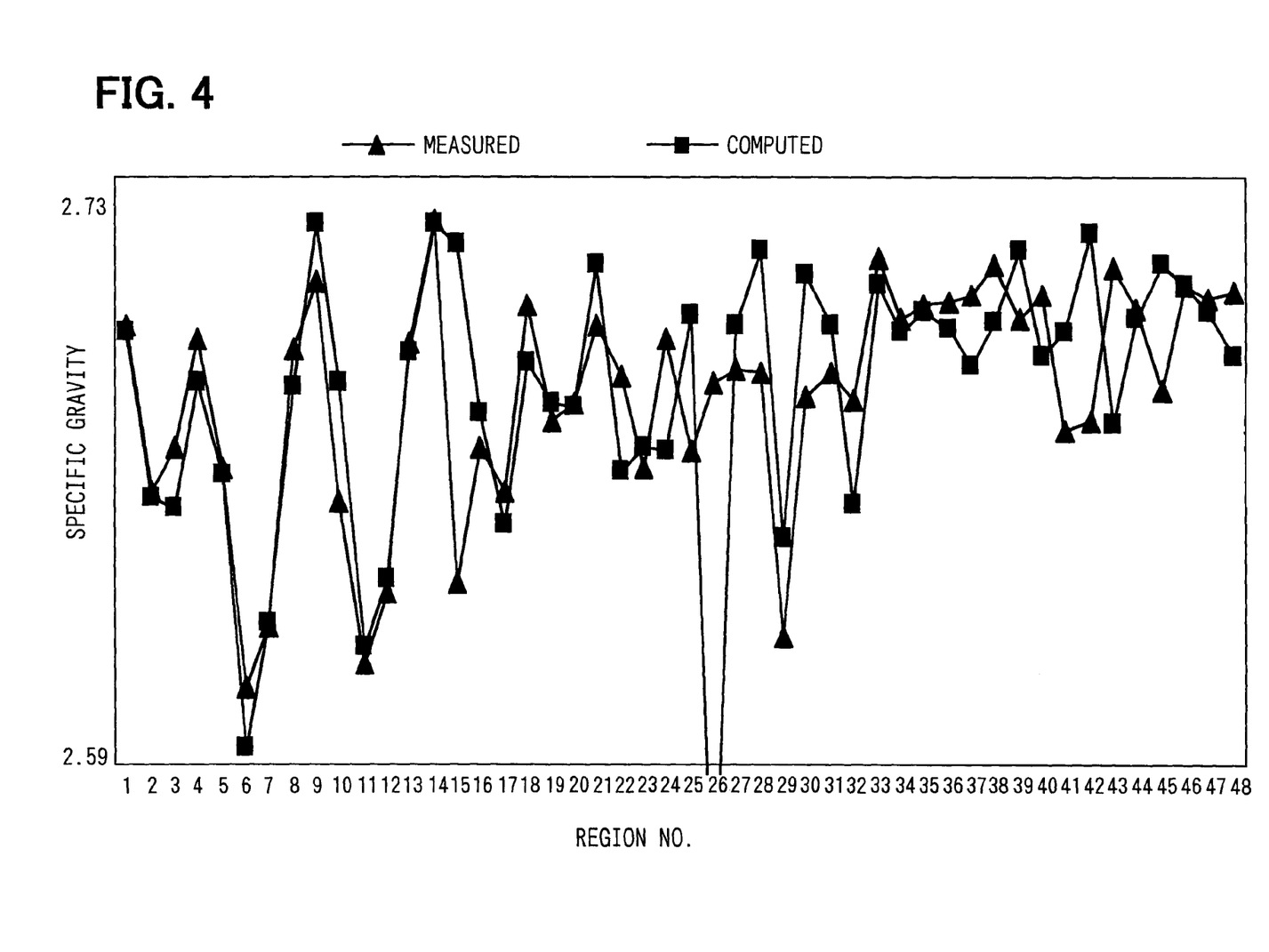
FIG. 4 is a graph showing actually measured values and computed values of a specific gravity in the respective regions of a second housing.
Figure 5:
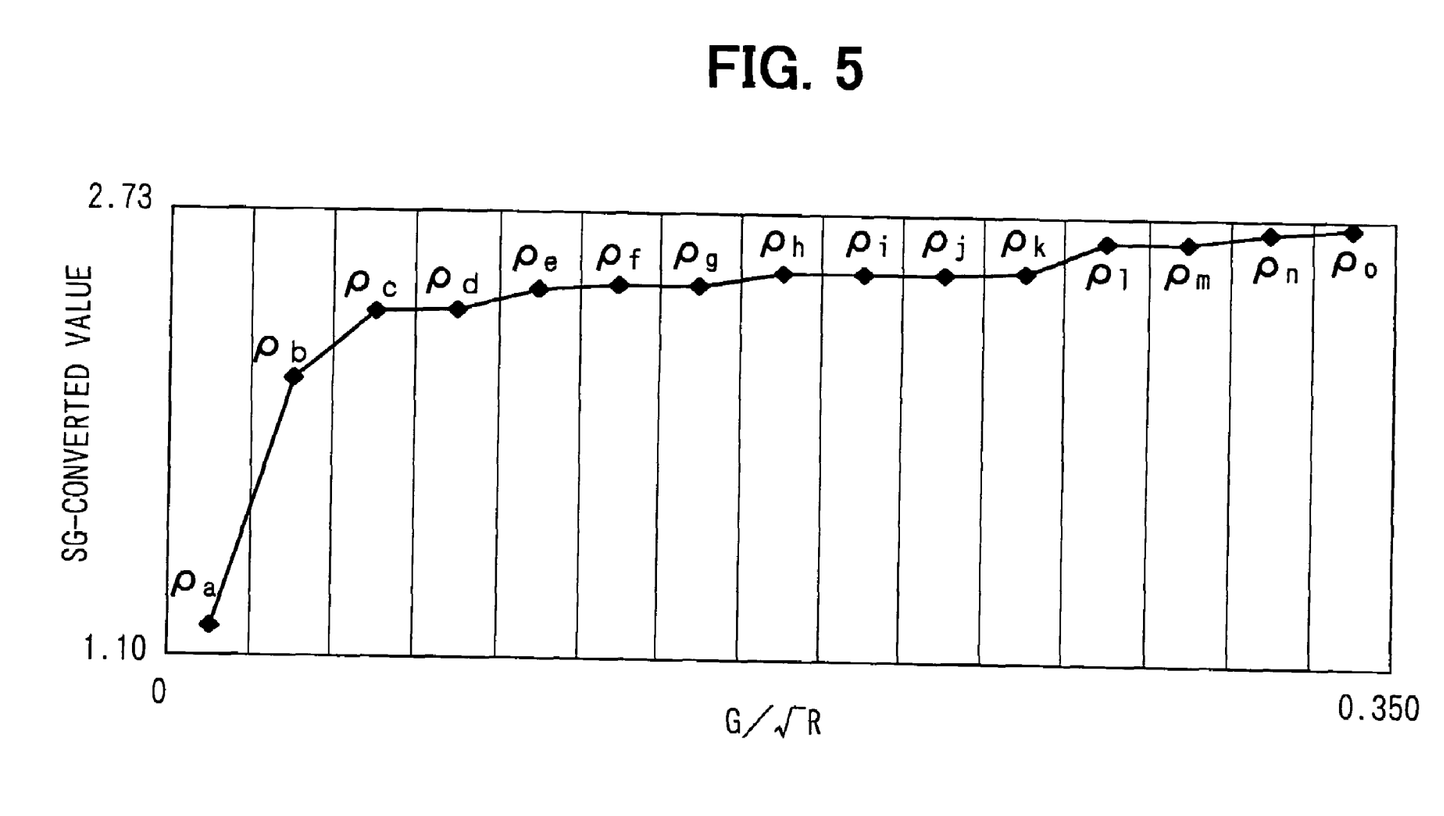
FIG. 5 is a graph showing specific-gravity-converted values corresponding to the respective strata of $G/\sqrt{R}$.

FIG. 4 shows computed specific gravities of the respective regions of the first housing and actually measured specific gravities of the corresponding regions of the second housing, as two graphs. FIG. 5 shows fifteen sg-converted values relative to the fifteen strata of $G/\sqrt{R}$.

A correlation coefficient between the two graphs in FIG. 4 is 0.75, which shows higher concordance rate than that shown in FIG. 3. It is because of the number of strata being larger than that shown in FIG. 3, which results in accurately grasping influence of the shrinkage porosity on the solid state properties of the product. Here, the reason why a region 25 does not have a specific gravity is that inlet portion of the melted metal is located in the region 25.

Second Embodiment

Figure 6:
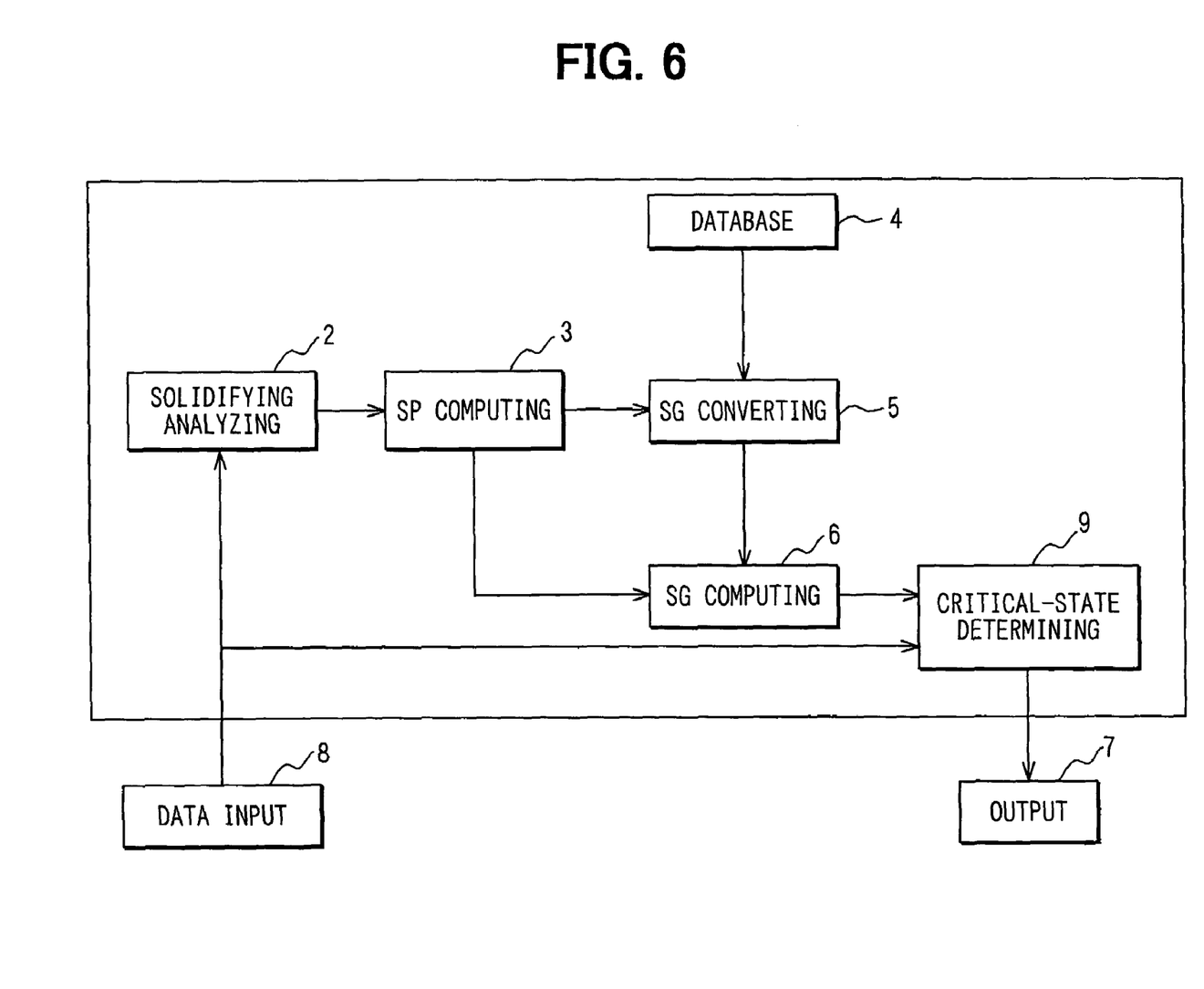
FIG. 6 is a block diagram showing an overall structure of a design-aiding device according to a second embodiment of the present.

A design-aiding device shown in FIG. 6 as a second embodiment of the present invention includes a datum input unit 8 in place of the input unit 1 of the first embodiment, and an additional critical-state determining unit 9, in comparison to the first embodiment.

The datum input unit 8 inputs shape data (three-dimensional solid model) of a designed casting product, a melted metal, casting condition, or the like. It further sets the number of strata of occurrence rates of shrinkage cavities, designates regions where specific gravities should be computed from the shape of the designed casting product, and sets critical specific gravities in the respective designated regions. The critical specific gravity is a specific gravity that cannot yield desired solid state properties such as strength of the designed casting product.

The critical-state determining unit 9 determines whether a specific gravity computed by the SG computing unit 6 is smaller than a critical specific gravity. When a given region is determined to have a smaller specific gravity than the critical specific gravity, the given region is recognized as a region that does not realize the desired properties. It is thereby notified to the designer through the output unit 7 that the given region should be redesigned. Other components in the second embodiment are the same as in the first embodiment, so that explanation will be eliminated.

Figure 7:
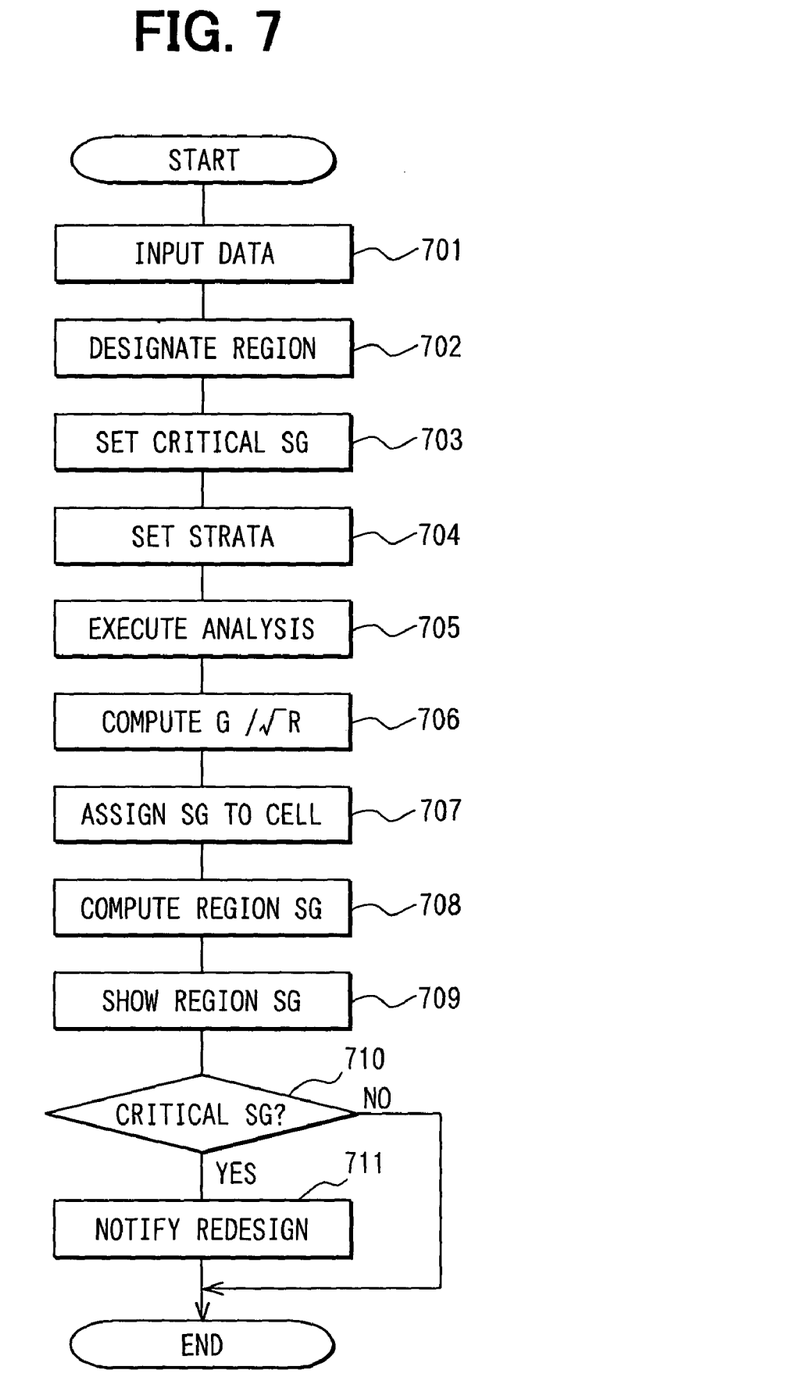
FIG. 7 a flow chart diagram explaining processing of a design-aiding program executed by the design-aiding device according to the second embodiment.

Processing of a design-aiding program executed in the design-aiding device according to the second embodiment will be explained with reference to FIG. 7.

At Step 701, shape data (three-dimensional solid model) of a designed casting product, a melted metal, casting condition, or the like are inputted.

At Step 702, a region of the casting product is designated for computing a specific gravity from the inputted three-dimensional solid model.

At Step 703, critical specific gravities (SG) are set with respect to the respective regions designated at Step 702. This is because properties such as strength required for the designed product depends on a region of the product.

At Step 704, the number (more than one) of strata of shrinkage porosity occurrence rates is set.

At Step 705, the three-dimensional solid model inputted at Step 701 is divided into a plurality of cells (tetrahedron). Heat-transfer solidifying of the melted metal in elapse of time is analyzed to thereby compute a temperature gradient (G) and cooling speed (R) of the melted metal in the respective cells.

At Step 706, a shrinkage porosity occurrence rate in each cell is computed as a value of $G/\sqrt{R}$ that is a shrinkage porosity predictive equation.

At Step 707, an SG-converted value based on the value of $G/\sqrt{R}$, the number of strata of occurrence rates of the shrinkage porosity, and the kind of melted metal used in casting is assigned to each cell.

At Step 708, a shrinkage porosity occurrence rate in each region designated at Step 702 is quantified as a specific gravity by the same steps as explained in the SG computing unit 6 of the first embodiment. Namely, SG-converted values $\rho(j)$ ($1 \leq j \leq m$) assigned to respective cells are searched and stratified. The number $N\rho(j)$ of the cells with respect to each SG-converted value $\rho(j)$ is multiplied with a cell volume $V\rho(j)$ corresponding to each SG-converted value $\rho(j)$. Each of the preceding products is furthermore multiplied with the SG-converted value $\rho(j)$, and summed up to obtain a region weight $$W\left(=\sum_{j=1}^{j=m} W\rho(j) = N\rho(1) \times V\rho(1) \times \rho(1) + \right.$$
$$\left. N\rho(2) \times V\rho(2) \times \rho(2) + \ldots + N\rho(m) \times V\rho(m) \times \rho(m)\right).$$

Finally, the quotient when the region weight W is divided by a region volume V is a region specific gravity $\rho$ ($=W/V$) that indicates the occurrence rate of the shrinkage porosity of the certain region.

At Step 709, the computed specific gravity of the region is shown to notify the designer.

At Step 710, it is determined whether the computed specific gravity is smaller than the critical specific gravity set at Step 703. When the computed specific gravity is determined to be smaller than the critical specific gravity, redesigning of the product should be notified to the designer.

When a given computed specific gravity of a given region within the designated regions is determined to be smaller than the critical specific gravity, the processing proceeds to Step 711. Here, redesigning of the given region of the product is notified to the designer. Otherwise, the processing is terminated.

In the next place, an instance of computing a specific gravity of each region in the second embodiment will be explained. A third housing of a product is divided into 52 regions to compute specific gravities of the respective regions in a final designing stage. A melted metal for casting, a melted metal supply-stopping temperature, a metal mold temperature, and a heat conduction coefficient are the same as in the second housing of the first embodiment. The critical specific gravity of each region of the third housing is set at 2.670. However, in a region where higher strength is required, the critical specific gravity is set at 2.700.

Figure 8:
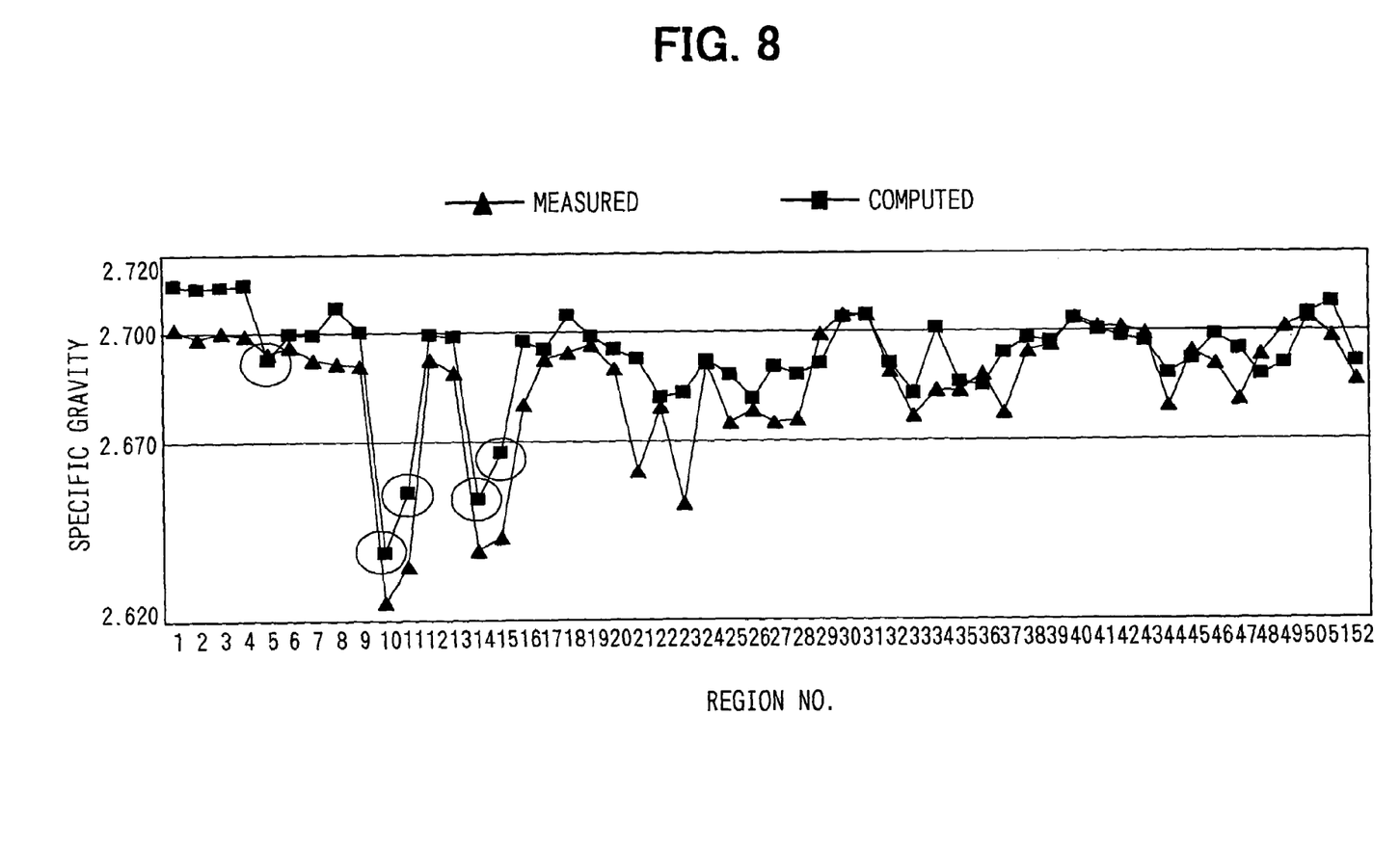
FIG. 8 is a graph showing actually measured values and computed values of a specific gravity in the respective regions of a third housing.

FIG. 8 shows computed specific gravities of the respective regions of the third housing and actually measured specific gravities of the corresponding regions of the third housing, as two graphs. As shown in FIG. 8, the computed specific gravities in the tenth, eleventh, fourteenth, and fifteenth regions, which are smaller than the critical specific gravity of 2.670, are shown by being encircled to being notified to the designer.

By contrast, although the specific gravity of the fifth region is not smaller than 2.6700, the fifth region is encircled. This is because the fifth region is required to have larger specific gravity than 2.700, for obtaining higher strength. Thus redesigning of the fifth region is also notified to the designer.

Furthermore, in the preceding embodiments, an alumina alloy is used as a melted metal for casting. However, other metal or metal alloy such as an iron and a copper can be used as a melted metal for casting.

The design-aiding method can be executed as a program in various computers. Here, the program can be stored in and read from a hard disk drive (HDD), a compact disk drive (CD), or the like, or can be downloaded via a communications network.

It will be obvious to those skilled in the art that various changes may be made in the above-described embodiments of the present invention. However, the scope of the present invention should be determined by the following claims.

What is claimed is:

1. A design-aiding device for designing a casting product, the device comprising:

analyzing means for analyzing solidification process based on temperature change of a melted material of the casting product in elapse of time in a three-dimensional model that corresponds to the casting product and is formed of a plurality of cells;

computing means for computing cell shrinkage porosity occurrence rates of the cells in the three-dimensional model from a result by the analyzing means with an equation where a temperature gradient of the melted material is divided by a square root of a cooling rate of the melted material;

converting means for stratifying the cell shrinkage porosity occurrence rates computed by the computing means and for converting the cell shrinkage porosity occurrence rates to specific gravity values;

quantifying means for quantifying a region shrinkage porosity occurrence rate of a region that is to be evaluated regarding the region shrinkage porosity occurrence rate, by computing a volume with respect to each of the specific gravity values converted by the converting means, multiplying the computed volume by each of the specific gravity values to obtain a product, and then summing up, to obtain a sum, all the products corresponding to all the specific gravity values included in the region, the quantifying means quantifying the region shrinkage porosity occurrence rate as a region specific gravity value by dividing the sum by a volume of the region; and outputting means for outputting the region specific gravity value;

critical value setting means for setting a critical specific gravity value; and determining means for determining whether the region specific gravity value is not greater than the critical specific gravity value set by the critical value setting means, and advising changing design when the region specific gravity value is determined to be not greater than the critical specific gravity value.

2. The design-aiding device for designing a casting product according to claim 1, wherein the critical value setting means sets the critical specific gravity value with respect to each of regions into which the three-dimensional model is divided.

* * * * *